Nov. 4, 1924.  
A. LLANO  
SOLDERING IRON  
Filed July 26, 1924
1,514,549
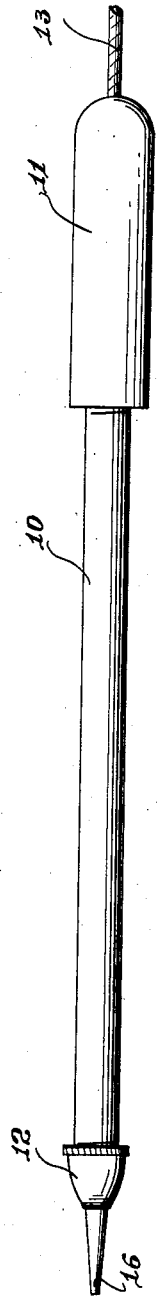
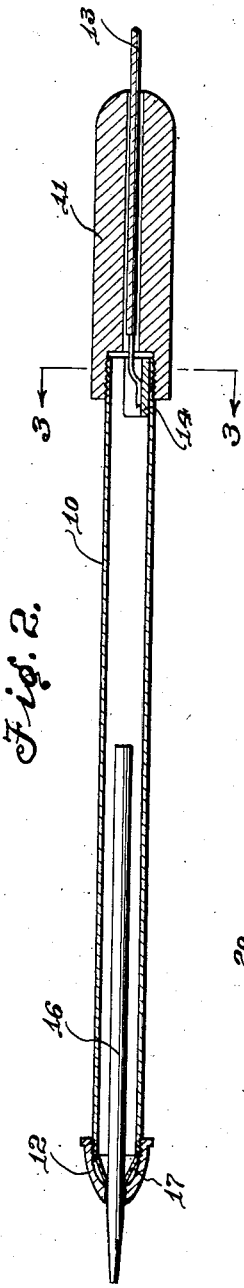
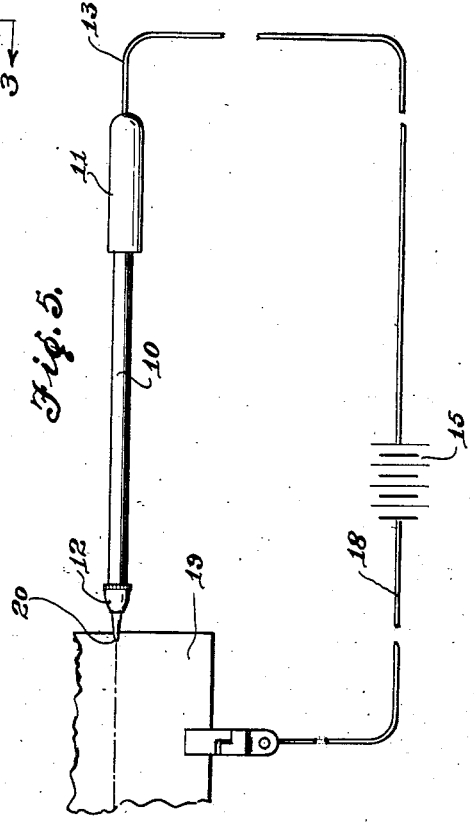
Inventor  
Archibald Llano
By  
Attorney Patented Nov. 4, 1924.

1,514,549

UNITED STATES PATENT OFFICE.

ARCHIBALD LLANO, OF BROOKLYN, NEW YORK, ASSIGNOR TO FRANK HENDERSON, OF NEW YORK, N. Y.

SOLDERING IRON.

Application filed July 26, 1924. Serial No. 728,320.

*To all whom it may concern:*

Be it known that I, ARCHIBALD LLANO, a citizen of the United States, residing at Brooklyn, in the county of Kings and State of New York, have invented certain new and useful Improvements in Soldering Irons, of which the following is a specification.

My said invention relates to a soldering iron and method of soldering and it is an object thereof to provide improved means whereby this operation can be carried on with great rapidity and can be done with facility in confined spaces or in situations where the ordinary soldering iron is liable to cause damage as by scorching the textile covering of wires.

Another object is to provide means whereby smearing of solder in undesired places is avoided, thereby avoiding the necessity of cleaning and scraping such places after the operation proper is completed. My device also provides very convenient means for the separation of soldered joints.

Referring to the accompanying drawings which are made a part hereof and on which similar reference characters indicate similar parts, Figure 1 is an elevation of the device of my invention, Figure 2, a central longitudinal section, Figure 3, a section on line 3—3 of Figure 2, Figure 4, a perspective of a part shown in Figure 2, and Figure 5, a plan illustrating the use of the device of my invention.

In the drawings reference character 10 indicates a tube which constitutes the body of my device and which may be made of any convenient material such as brass. This tube is threaded at one end to receive a handle 11 of non-conducting material and at the other end to receive a cap 12. The handle has a longitudinal cavity for a conductor 13 which may be permanently secured to the tube at 14 and which is connected at the other end to a battery 15 in any conventional or desirable manner.

The cap 12 has an aperture which fits closely about a pencil 16 which is preferably made of carbon though I do not restrict myself to this specific material as other materials equivalent to carbon for the purpose of my invention are known to those skilled in the art. One such substance is aluminum which like carbon offers high resistance to the passage of electric current so that it may be highly heated locally and which does not hold solder, it being characteristic of my invention that the solder is not applied by the device directly and is never applied to the device itself but rather that the substance or object to which the solder is to be applied is heated and then the solder is applied directly thereto.

A split sleeve 17 of tin or other good conducting material in the form of a truncated cone is positioned inside the cap 12 with its base resting against the end of the body 10 and its upper margin bearing against the carbon pencil. By screwing down the cap 12 the sleeve is caused to clamp the pencil securely in place and also makes a good electrical contact with it.

The method of use of my invention will be plain from consideration of Figure 5. The parts hitherto described being connected in the manner there indicated, a conductor 18 is secured at one end to the negative terminal of the battery, the conductor 13 being secured to the positive terminal, and the other end of the conductor 18 is electrically connected to the article to be soldered, said article being here conventionally indicated at 19. If it be desired, for example, to attach a wire to this object at the point indicated at 20 the point of the carbon pencil will be brought to the spot or nearly adjacent to the spot where the joint is to be made and the current flowing through the pencil will quickly heat the wire and the part 19 (locally) to a high temperature. The solder being now applied in any desirable way according to the position and nature of the joint desired will melt and flow about the heated parts thus making a neat and permanent joint. In some cases the tip of the iron may be held as far as one inch from the point of application of solder with good results.

The battery will preferably, for most purposes, consist of three dry cells which will afford a 6-volt current that will be sufficient for all ordinary purposes and which may be very conveniently carried about the person. Such a battery can be very conveniently attached in the relation indicated thereby avoiding the difficulties incident to removal of an electric light from its socket and attachment to the socket as is done in some instances, and also the difficulties of other well-known cumbersome methods heretofore practiced.

In addition to the convenience of this source of current it may be noted that the carbon pencil will be exposed only for a short distance (about one-half inch) and even if it should be heated throughout the entire exposed length it will still be practical to work among a mass of insulated wires without much danger of scorching the insulating covering (usually silk) of any of the wires. Because of the small diameter of the device at the end it is possible to work in all sorts of confined spaces and awkward situations where the use of the ordinary soldering iron is almost impossible. When soldered joints are to be separated my device avoids the necessity of cleaning the soldering iron because of the capacity of applying heat precisely where it is desired and so enables such work to be done very quickly.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. A method of soldering by charging with one polarity the work to be soldered, generating a soldering heat by juxtaposition of the other pole of a source of low potential, and flowing solder from a cooler to a hotter part of the work, substantially as set forth.

2. A method of soldering by charging with one polarity the work to be soldered, generating a soldering heat by juxtaposition of the other pole of a source of low potential and bringing solder into contact with the heated work in the cooler section of the heated zone, substantially as set forth.

3. A method of soldering by charging with one polarity the work to be soldered, generating a soldering heat by juxtaposition of the other pole of a source of low potential to form an arc, and bringing solder into contact with the work within the heated zone at a distance from said arc, substantially as set forth.

4. In a single pole soldering iron, a tubular body, a handle in line with the body, a perforated cap having threaded connection with the lower end of the body, a carbon rod extending lengthwise of the body and spaced from the walls thereof for cooling purposes, and resilient means within the tool forced into clamping engagement with the rod by said cap, substantially as set forth.

5. In a single pole soldering iron, a tubular body, a carbon rod extending lengthwise of the body and spaced from the walls thereof to prevent heating of the body, and means for holding said rod in place said means permitting longitudinal adjustment thereof, substantially as set forth.

In witness whereof, I have hereunto set my hand and seal at Washington, District of Columbia, this twenty-fifth day of July, A. D. nineteen hundred and twenty-four.

ARCHIBALD LLANO. [L. S.]

Witnesses:
FRANK W. DAHN,
O. M. KEYS.